(12) United States Patent
Lu

(10) Patent No.: US 10,413,071 B2
(45) Date of Patent: Sep. 17, 2019

(54) ELECTRIC PUSH ROD AND ELECTRIC HEADREST SUPPORT

(71) Applicant: Dongguan Weihong Hardware and Plastic Products Co., Ltd., Dongguan (CN)

(72) Inventor: Wei Lu, Dongguan (CN)

(73) Assignee: DONGGUAN WEIHONG HARDWARE AND PLASTIC PRODUCTS CO., LTD., Dongguan (CN)

( * ) Notice: Subject to any disclaimer, the term of this patent is extended or adjusted under 35 U.S.C. 154(b) by 120 days.

(21) Appl. No.: 15/863,064

(22) Filed: Jan. 5, 2018

(65) Prior Publication Data

US 2018/0125242 A1    May 10, 2018

(30) Foreign Application Priority Data

Aug. 9, 2017 (CN) .................... 2017 2 0994080 U

(51) Int. Cl.
  *A47C 7/38* (2006.01)
  *A47C 17/04* (2006.01)
  *F16H 25/20* (2006.01)
(52) U.S. Cl.
  CPC ............... *A47C 7/38* (2013.01); *A47C 17/04* (2013.01); *F16H 2025/204* (2013.01)

(58) Field of Classification Search
  CPC .................................. A47C 7/38; A47C 17/04
  USPC .......................................................... 297/410
  See application file for complete search history.

(56) References Cited

U.S. PATENT DOCUMENTS

| | | | | |
|---|---|---|---|---|
| 4,765,683 A * | 8/1988 | Hattori | ................... | B60N 2/829 297/410 |
| 4,923,250 A * | 5/1990 | Hattori | ................... | B60N 2/829 297/410 |
| 5,433,508 A * | 7/1995 | Akima | ................... | B60N 2/829 297/410 |
| 6,543,852 B2 * | 4/2003 | Mori | ................... | B60N 2/0224 297/410 |

* cited by examiner

*Primary Examiner* — Anthony D Barfield
(74) *Attorney, Agent, or Firm* — Shimokaji IP

(57) ABSTRACT

An electric push rod includes a drive motor, an outer tube, a threaded rod, a screw nut and a slider block. The outer tube is fixed to the drive motor, the threaded rod and the screw nut are located in the outer tube, the screw nut is in a threaded connection with the threaded rod, the drive motor is connected with the threaded rod to drive the threaded rod, and the slider block is sleeved on the outer tube and supported on the screw nut. When the threaded rod is rotated inversely to actuate the screw nut to move downwards, the slider block will not move downwards or trend to move downwards due to the screw nut fails to fix on the slider block, thus hands or fingers will not be jammed by the headrest even if the hands or fingers are rested beneath the headrest.

10 Claims, 8 Drawing Sheets

ELECTRIC PUSH ROD AND ELECTRIC HEADREST SUPPORT

RELATED APPLICATIONS

This application claims the benefit of priority to Chinese Utility Model Application No. 201720994080.6 filed on Aug. 9, 2017, which is hereby incorporated by reference in its entirety.

FIELD OF THE INVENTION

The present invention relates to a field of furniture parts, more particularly to an electric headrest support and an electric push rod.

BACKGROUND OF THE INVENTION

Generally, angles of a headrest of sofa can be adjusted to improve comfort. One of the achievement manners is to set a headrest support in the sofa. The headrest support includes two fasteners, an electric push rod and a plurality of linkages, therein one fastener is fixed to the sofa body, another one is fixed to the headrest, the electric push rod is for driving the linkages to fold or unfold to change the relative position of the two fasteners, so that the angles of the headrest can be adjusted.

As shown in FIGS. 1 and 2, a conventional electric push rod 9 includes a drive motor 91, an outer tube 92, a threaded rod 93 and a slider block 94. Specifically, the outer tube 92 is hollow and fixed to the drive motor 91, the threaded rod 93 is located in the outer tube 92 and driven by the drive motor 91. The slider block 94 is sleeved on the outer tube 92 connected with the threaded rod 93 in the outer tube 92 via a screw hole 95, and then the slider block 94 is fixed to the linkages of the headrest. When the drive motor 91 is started up, the slider block 94 will move upwards or downwards to achieve the adjustment of the headrest angles.

However, such electric push rod has following disadvantages. Since the slider 94 is moved along with the rotation of the threaded rod 93, thus when the headrest is retracted to fold, the continuous movement of the slider block 94 may jam user's hands or fingers if the hands or fingers are rested under the headrest.

Thus it's necessary to provide an electric push rod that can prevent user's hands or fingers from being jammed, so as to ensure the user safety.

SUMMARY OF THE INVENTION

One objective of the present invention is to provide an electric push rod that can prevent user's hands from being jammed.

Another objective of the present invention is to provide an electric headrest support with an electric push rod.

To achieve the above objectives, an electric push rod of the present invention includes a drive motor, an outer tube, a threaded rod, a screw nut and a slider block. The outer tube is fixed to the drive motor, the threaded rod and the screw nut are located in the outer tube, the screw nut is in a threaded connection with the threaded rod, the drive motor is connected with the threaded rod to drive the threaded rod, and the slider block is sleeved on the outer tube and supported on the screw nut.

When the threaded rod is rotated positively to actuate the screw nut to move upwards, the slider block will be pushed by the screw nut to actuate the linkages to expand the angle of the headrest due to the slider block is supported on the screw; when the threaded rod is rotated inversely to actuate the screw nut to move downwards, the slider block will not move downwards or trend to move downwards due to the screw nut fails to fix on the slider block, thus hands or fingers will not be jammed by the headrest even if the hands or fingers are rested under the headrest. By this token, the device is safe.

Preferably, the electric push rod further includes a fixed base, the outer tube and the drive motor are fixed on the fixed base respectively, and output axis of the threaded rod and the drive motor are extended into the fixed base.

Preferably, a limiting cover is provided at a top of the outer tube to limit the slider block.

Preferably, a side wall of the outer tube is provided with a guiding slot that is extended from up to down, and the screw nut is provided with a guiding rib that is slid within the guiding slot.

Preferably, a side wall of the outer tube is provided with a guiding slot that is extended from up to down, the slider block comprises a main body that is sleeved around the outer tube and a support portion located in the outer tube, the support portion is fixed on the main body via a connection portion which is slid within the guiding slot, and the support portion is provided with a through hole through which the threaded rod passes.

An electric headrest support of the present invention includes an adjusting assembly and the electric push rod. The adjusting assembly includes a sliding rail, a first fastener, a second fastener, a first linkage, a second linkage, a third linkage and a fourth linkage. The sliding rail includes a first rail and a second rail that are slidably connected with each other, the first rail is fixed on the first fastener, the second rail is fixed on a lower end of the first linkage, one end of the second fastener is pivotally connected to an upper end of the first linkage, one end of the second linkage is pivotally connected to one end of the second fastener, the first linkage and the second linkage are adjacently connected to the second fastener, one end of the third linkage is pivotally connected to a middle part of the first linkage, another end of the third linkage is pivotally connected to one end of the fourth linkage, another end of the fourth linkage is pivotally connected to the first rail, another end of the second linkage is pivotally connected to a middle part of the third linkage, the drive motor of the electric push rod is connected with the first fastener, and the slider block is connected with the first linkage Preferably, two said adjusting assemblies are arranged, and the electric push rod is configured between the two adjusting assemblies.

Preferably, the electric headrest support further includes a fixed rod and a drive rod. Two ends of the fixed rod are respectively fixed to two first fasteners of the two adjusting assemblies, two ends of the drive rod are respectively fixed to two first linkages of the two adjusting assemblies, the drive motor is configured on the fixed rod, and the slider block is connected with the drive rod.

Preferably, a top of the first linkage is provided with an arc-shape limiting slot, the second fastener is provided with a limiting pin which is slid within the limiting slot.

Preferably, an elastic member is arranged between the first linkage and the second fastener to cause the second fastener to fold.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1:
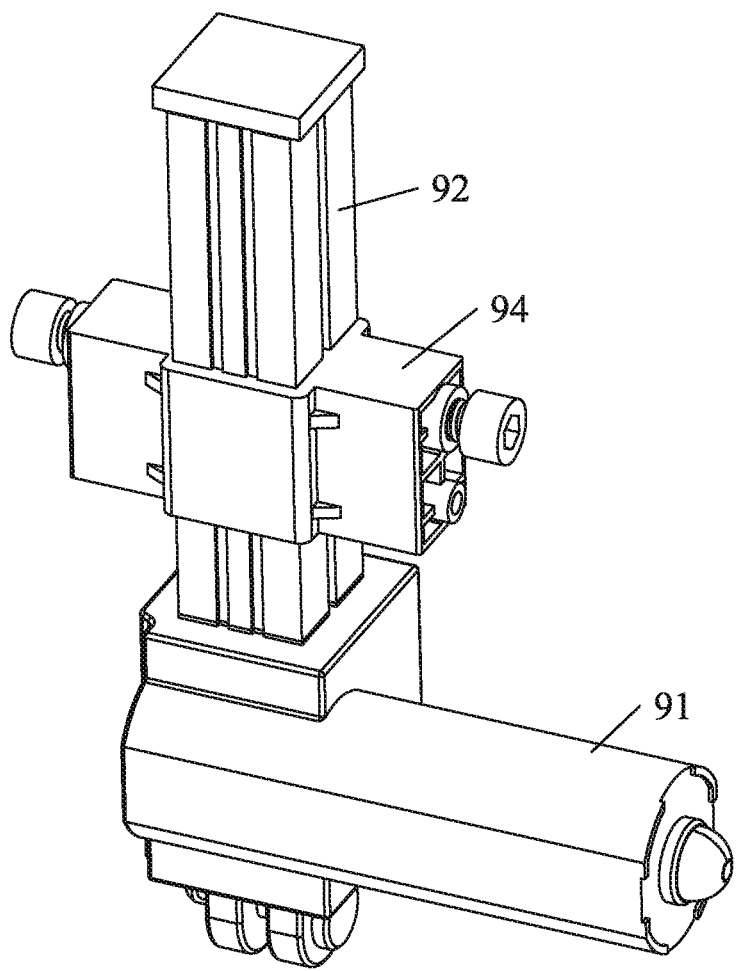
FIG. 1 is a perspective view of a conventional electric push rod.
Figure 2:
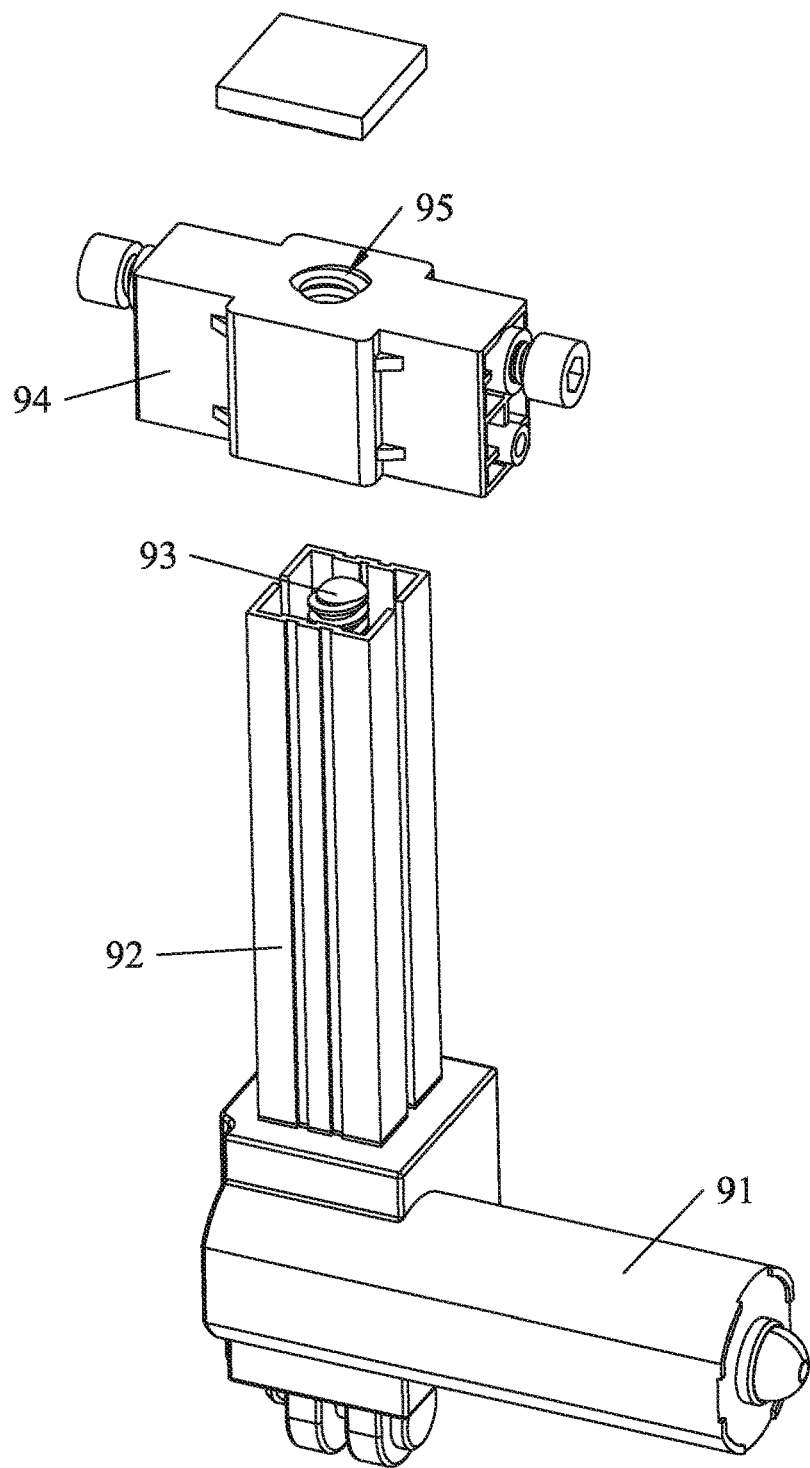
FIG. 2 is an exploded view of a conventional electric push rod.
Figure 3:
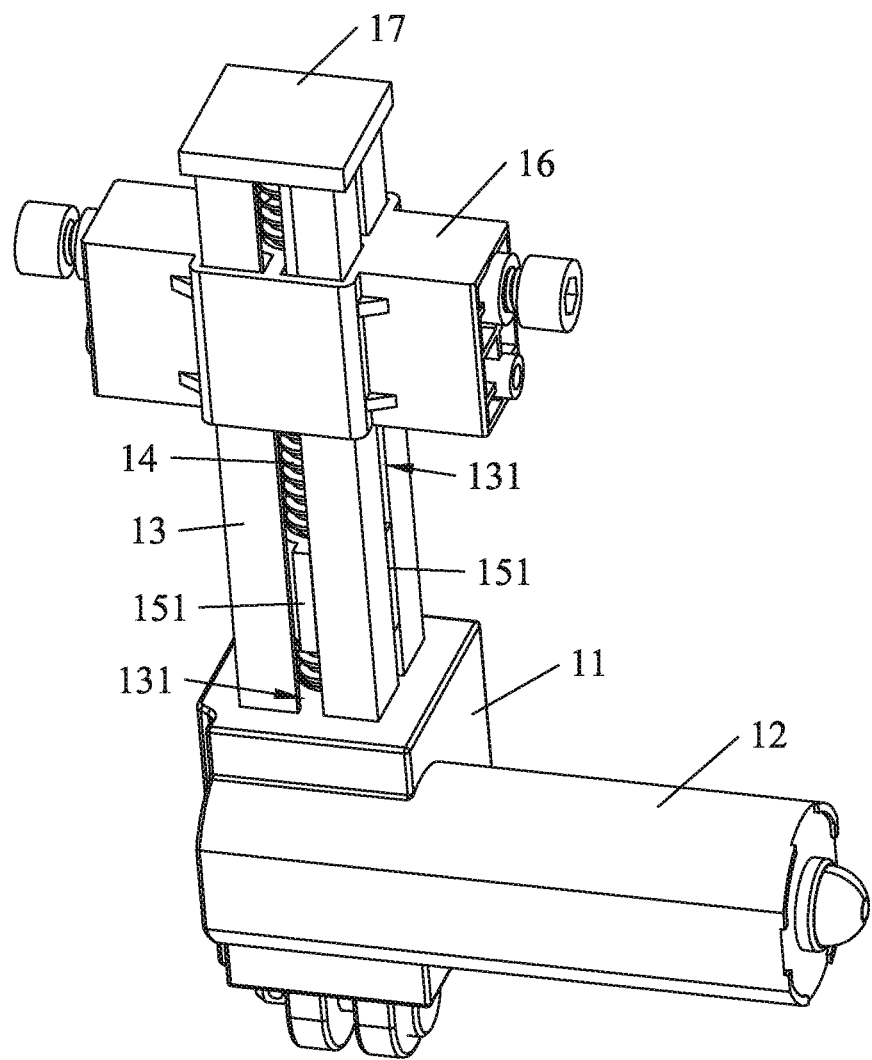
FIG. 3 is a perspective view of an electric push rod according to one embodiment of the present invention.
Figure 4:
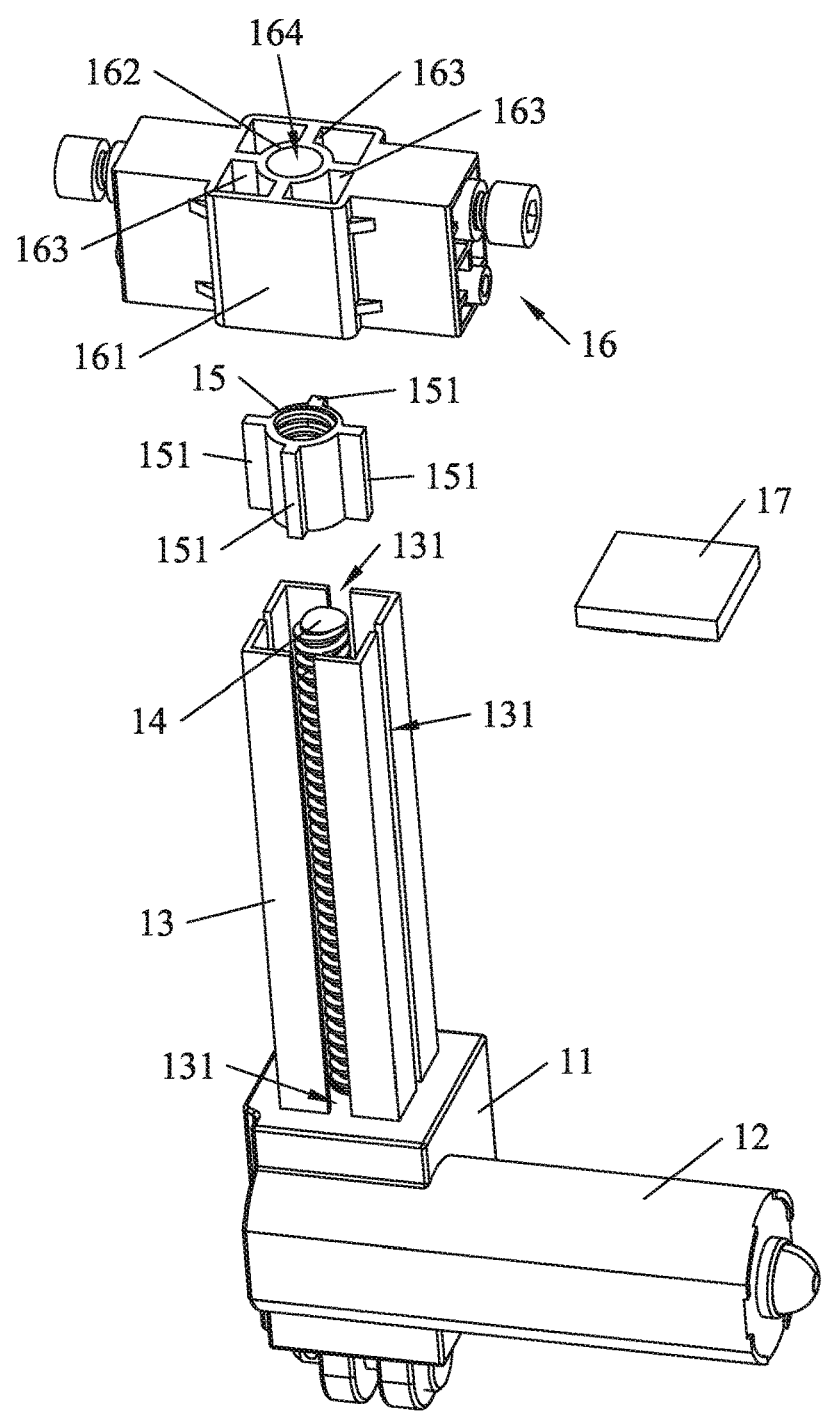
FIG. 4 is an exploded view of an electric push rod according to one embodiment of the present invention.

As illustrated in FIGS. 3 and 4, an electric push rod 1 according to one embodiment of the present invention includes a fixed base 11, a drive motor 12, an outer tube 13, a threaded rod 14, a screw nut 15 and a slider block 16.

Specifically, the drive motor 12 is fixed on one side of the fixed base 11, and the outer tube 13 that is a hollow structure is fixed on the top of the fixed base 11. The threaded rod 14 is located inside the outer tube 13 and inserted into the fixed base 11, and an output axis of the drive motor 12 is extended into the fixed base 11 to connect with and drive the threaded rod 14. Of course, the fixed base 11 is provided with related structures by which the action of the output axis of the drive motor 12 can pass to the threaded rod 14. The output axis of the drive motor 12 can rotate positively or inversely, accordingly, the threaded rod 14 can rotate positively or inversely. The screw nut 15 is located within the outer tube 13 and sleeved on the threaded rod 14 in threaded connection. The screw nut 15 will move upwards relative to the threaded rod 14 if the threaded rod 14 rotates positively, instead will move downwards if the threaded rod 14 rotates inversely.

A guiding slot 131 that is extended from up to down is provided at a side wall of the outer tube 13, a guiding rib 151 is provided at an outer wall of the screw nut 15, and the guiding rib 151 is extended into the guiding slot 131 and slideable in the guiding slot 131. By means of the match of the guiding rib 151 and the guiding slot 131, the screw nut 15 can move along the threaded rod 14. Specifically, the outer tube 13 in the present embodiment is a square tube and has four side walls each of which is provided with the guiding slot 131, accordingly, four guiding ribs 151 are formed on the outer wall of the screw nut 15. Of course, the outer tube 12 can be a circular tube or other shapes, and the amounts of the guiding slots 131 and the guiding ribs 151 can be more than or less than four.

The slider block 16 includes a main body 161 sleeved on the outer tube 13, which has a cavity and a support portion 162 located in the cavity. The support portion 162 is connected with the main body 161 via four connecting portions 163 which are located in the four guiding slots 131 of the outer tube 13 so that the slider block 16 can stably slide along the outer tube 13. A through hole 164 is formed on the support portion 162, through which the threaded rod 14 passes. It should be noted that, there is no connection relationship between the threaded rod 14 and the support portion 162, the rotation of the threaded rod 14 is independent with the sliding of the slider block 16.

As shown in FIGS. 3 and 4, a limiting cover 17 is provided at a top of the outer tube 13, which has lager size than the outer tube 13. In such s way, the stroke of slider block 16 can be limited by the limiting cover 17, to prevent the disengagement of the slider block 16.

Figure 5:
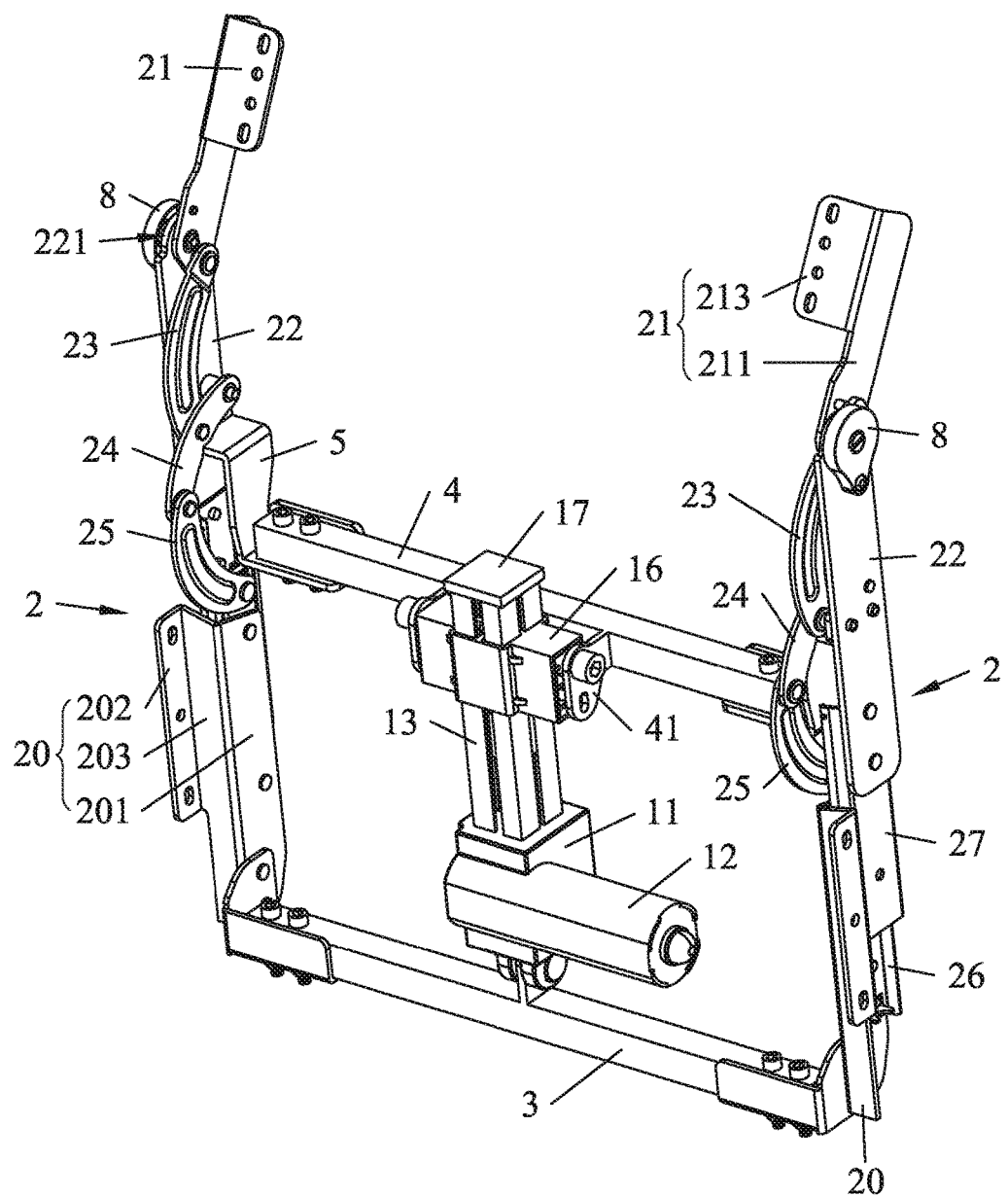
FIG. 5 is a perspective view of an electric headrest support according to one embodiment of the present invention.
Figure 6:
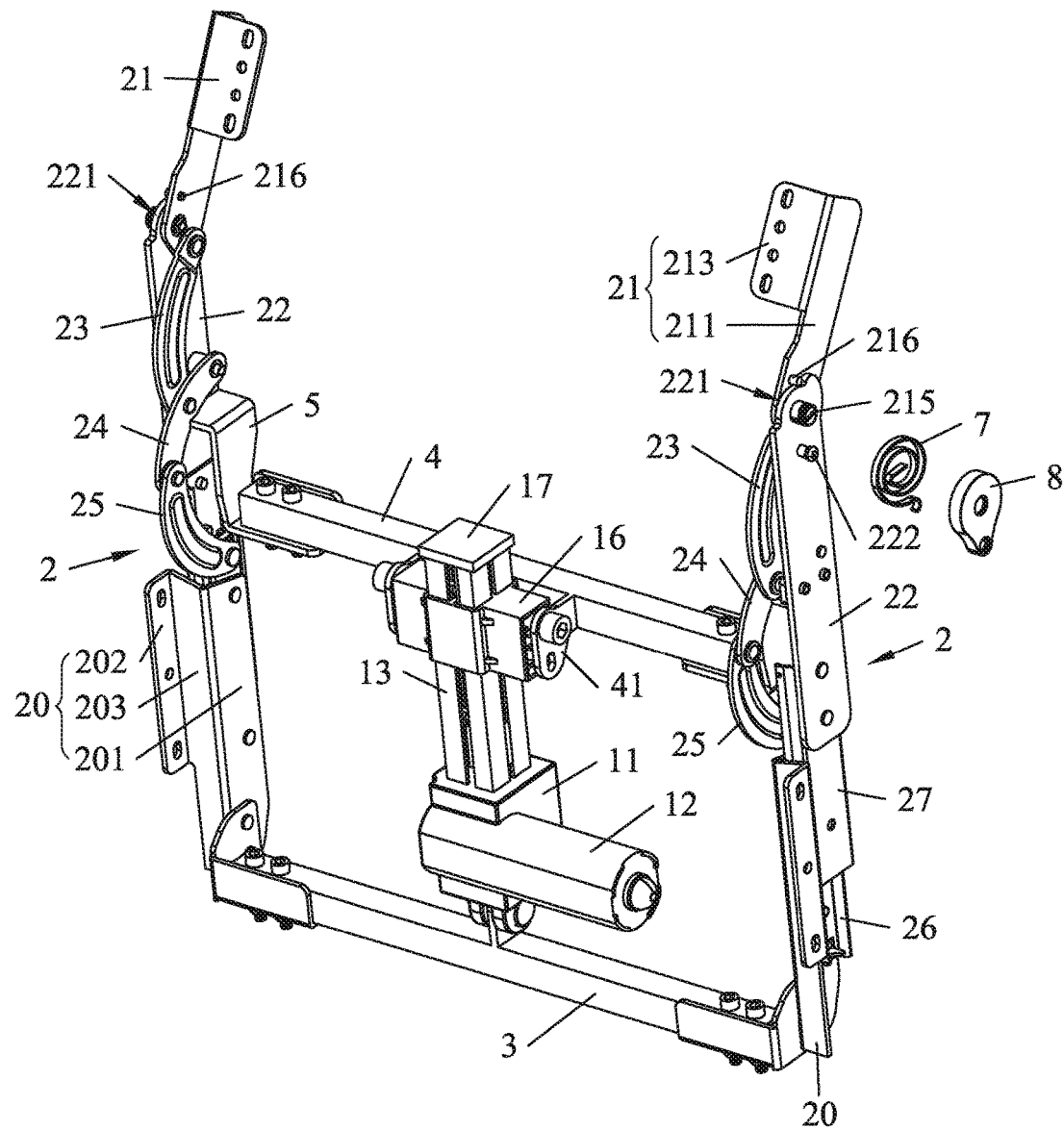
FIG. 6 is a partial exploded view of an electric headrest support according to one embodiment of the present invention.

Combining with FIGS. 5 and 6, an electric headrest support including the electric push rod 1 is provided, for automatically adjusting the angle of the headrest and preventing the user's finger from being jammed. The electric headrest support includes an adjusting assembly 2, and the adjusting assembly 2 includes a sliding rail, a first fastener 20, a second fastener 21, a first linkage 22, a second linkage 23, a third linkage 24 and a fourth linkage 25. Specifically, the first fastener 20 is fixed to the sofa body, and the second fastener 21 is fixed to the sofa headrest. The sliding rail includes a first rail 26 and a second rail 27 that are slidably connected with each other, the first rail 26 is fixed on the first fastener 20, the second rail 26 is fixed on a lower end of the first linkage 22, one end of the second fastener 21 is pivotally connected to an upper end of the first linkage 22, one end of the second linkage 23 is pivotally connected to one end of the second fastener 21, the first linkage 22 and the second linkage 23 are connected to the second fastener 21 adjacently, one end of the third linkage 24 is pivotally connected to a middle part of the first linkage 22, another end of the third linkage 24 is pivotally connected to one end of the fourth linkage 25, another end of the fourth linkage 25 is pivotally connected to the first rail 26, another end of the second linkage 23 is pivotally connected to a middle part of the third linkage 24, the drive motor 12 of the electric push rod 1 is connected with the first fastener 20, and the slider block 16 is connected with the first linkage 22.

In this embodiment, the number of the adjusting assembly 2 is two, and the electric headrest support further includes a fixed rod 3 and a drive rod 4, the electric push rod 1 is configured between the two adjusting assemblies 2 by means of the fixed rod 3 and the drive rod 4 to actuate the adjusting assemblies 2.

For each adjusting assembly 2, the second, third and fourth linkages 23, 24, 25 are arc-shaped linkages, while the first linkage 21 is a long strip structure. Relative to the first linkage 22, the second fastener 21, the second, third and fourth linkages 23, 24, 25 and the sliding rail are located at the same side of the first linkage 22. Relative to the sliding rail, the first fastener 20 and the first linkage 22 are respectively fixed on the front and rear side of the sliding rail.

Figure 7:
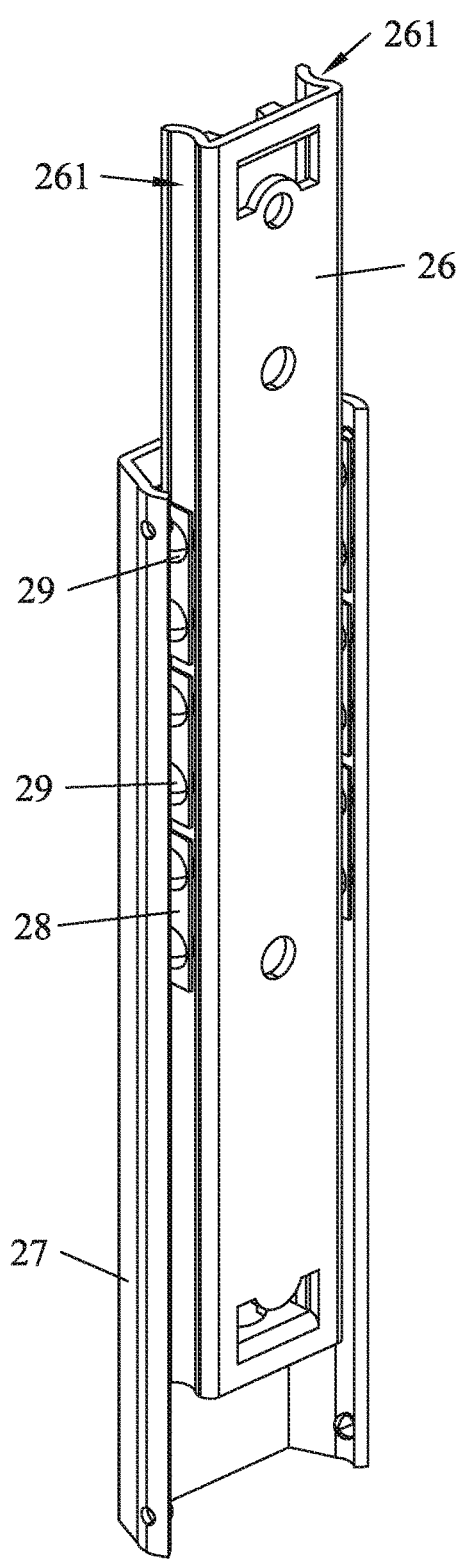
FIG. 7 is a structural view of a sliding rail of the electric headrest support.
Figure 8:
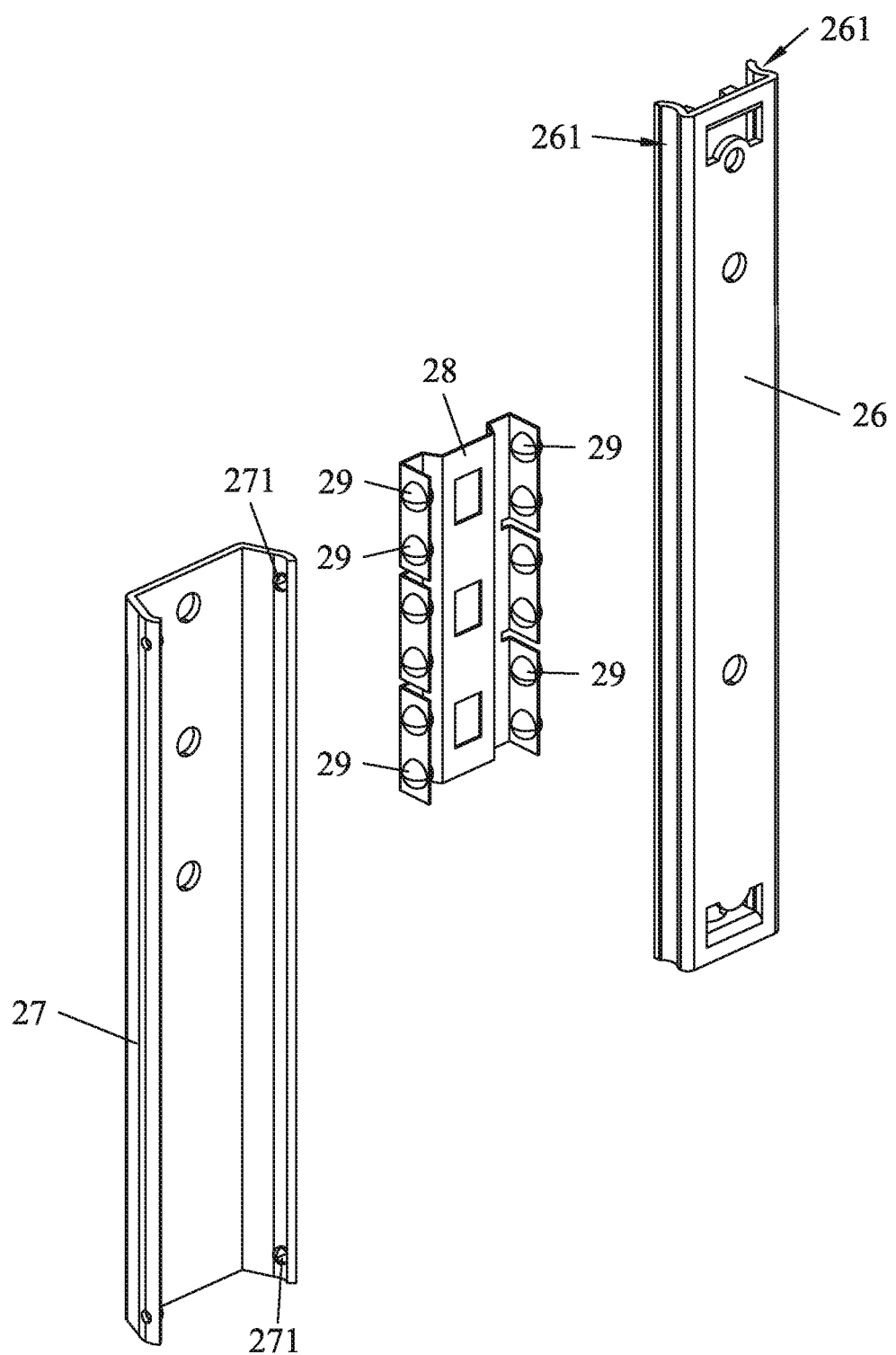
FIG. 8 is an exploded view of the slider rail of FIG. 7.

As shown in FIGS. 7 and 8, the sliding rail further includes an inner member 28 and multiple roll balls 29 inside the first and the second rails 26 and 27. Two rolling slots 261 are formed at both sides of the first rail 26. The inner member 28 is fixed to the first rail 26, and the cross section of the inner member 28 is in a shape of "⌊⌋", and the inner member 28 has two bent end portions that are corresponding to the two rolling slots 261. The two bent end portions of the inner member 28 are provided with a row of holes where the roll balls 29 are fixed, meanwhile, a part of each roll ball 29 is received in the rolling slot 261. Similarly, the cross section of the second rail 27 is in a shape of "⌊⌋" as well, and the second rail 27 is covered on the first rail 26, the inner member 28 and the roll balls 29, further, the bent side portions of the second rail 27 clap a part of the roll balls 29. In such a way, the second rail 27 and the first rail 26 are connected together, and the first rail 26 can slide relative to the second rail 27 under the rolling action of the roll balls 29. Further, a limiting portion 271 is formed at the inner walls of the bent sides of the second rail 27 to contact with the roll balls 29, thereby limiting the stroke of the second rail 27 relative to the first rail 26. Of course, other suitable sliding rails also can be used.

Referring to FIGS. 5 and 6, the first fastener 20 includes a first portion 201 and a second portion 202 that are parallel to each other, and a connection portion 203 connected between the first and the second portions 201, 202. The first rail 26 is fixed to the first portion 201, the connection portion 203 is located at a side of the sliding rail, while the second portion 202 is fixed to the sofa body by means of rivets, etc. Specifically, the first portion 201, the second portion 202 and the connection portion 203 are integrated in a unity. The second fastener 21 includes a main member 211 and a fixed portion 213 which is connected at one end of the main member 211 and approximately perpendicular to the main member 211, and the fixed portion 213 is fixed to the sofa headrest by rivets, and the like.

As shown, a top of the first linkage 22 is provided with an arc-shape limiting slot 221, the second fastener 21 is provided with a limiting pin 216 which is extended into the limiting slot 221. When the second fastener 21 pivots relative to the first linkage 22, the limiting pin 216 is slid within the limiting slot 221. In such a way, the swing range of the second fastener 21 can be limited, so as to define the adjusting range of the headrest.

In the embodiment, all pivotal connections between two adjacent linkages, between the linkage and the fastener, and between the linkage and the first rail 26 are achieved by means of rivets, and all pivoting axis are parallel to each other.

Specifically, two ends of the fixed rod 3 are respectively connected with the two first fasteners 20 of the two adjusting assemblies 2. The drive rod 4 is located above the fixed rod 3 and parallel to the fixed rod 3, two ends of the drive rod 4 are respectively fixed to the two first linkages 22 of the two adjusting assemblies 2. Specifically, two ends of the drive rod 4 are provided with a connecting member 5 respectively, one end of the connecting member 5 is fixed to the drive rod 4, and the other end of the connecting member 5 is fixed to the first linkage 22. Since the first fastener 20 is arranged at the inner side of the sliding rail, while the first linkage 22 is arranged at the outer side of the sliding rail, thus this connecting member 5 is necessary to arrange at the end of the drive rod 4, so that the connection between the drive rod 4 and the first linkage 22 can be achieved, and the action of the drive rod 4 may not be interfered by the first fastener 20.

As illustrated, the fixed base of the electric push rod 1 is pivotally connected to a middle position of the fixed rod 3, so that the entirety of the electric push rod 1 can pivot relative to the fixed rod 3. Two pivoting arms 41 protruding toward the electric push rod 1 are formed on the drive rod 4 and located at two sides of the slider block 16 to connect with the slider block 16. Combing with FIGS. 3 and 5, when the threaded rod 14 is rotated positively to actuate the screw nut 15 to move upwards, the slider block 16 is pushed accordingly to actuate the drive rod 4 to move upwards, further, the adjusting assemblies 2 are driven to unfold the multiple linkages, finally the headrest is unfolded to the highest position as shown in FIG. 5. Conversely, when the threaded rod 14 is driven by the drive motor 14 to rotate inversely, the screw nut 15 will move down, accordingly, the slider block 16 will be disengaged from the screw nut 15, by this token, the rotation of the threaded rod 14 will not cause the headrest to fold. Therefore, user's hand or fingers will not be jammed by the headrest even if the slider block 16 moves down due to the weight itself.

In the above embodiment, since the drive motor 12 can't drive the headrest to retract, thus it's required to retract the headrest manually, which is inconvenient. For simplifying the operation, an elastic member can be arranged between the first linkage 22 and the second fastener 21, so as to urge the automatic retraction of the second fastener 21. As illustrated in FIG. 6, the elastic member is a coil spring 7 of which one end is fixed to a fixing pin 215 mounted on the second fastener 21, another end is hooked to a fixing pole 222 mounted on the first linkage 22. During the angle of the headrest is expanded by swinging the second fastener 21, the coil spring 7 is compressed gradually. Once the slider block 16 disengages from the screw nut 15, the coil spring 7 urges the second fastener 21 to swing reversely, thereby folding the multiple linkages to cause the slider block 16 to move to the initial position on the screw nut 15 finally. Optionally, the coil spring 7 can be arranged in either adjusting assembly 2; however, both adjusting assemblies 2 equipped with a respective coil spring 7 are preferred to make force balanced. In addition, an outer cover 8 is coved on the coil spring 7 for protection.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. An electric push rod, comprising a drive motor, an outer tube, a threaded rod, a screw nut and a slider block, wherein the outer tube is fixed to the drive motor, the threaded rod and the screw nut are located in the outer tube, the screw nut is in a threaded connection with the threaded rod, the drive motor is connected with the threaded rod to drive the threaded rod, and the slider block is sleeved on the outer tube and supported on the screw nut.

2. The electric push rod according to claim 1, further comprising a fixed base, wherein the outer tube and the drive motor are fixed on the fixed base respectively, and output axis of the threaded rod and the drive motor are extended into the fixed base.

3. The electric push rod according to claim 1, wherein a limiting cover is provided at a top of the outer tube to limit the slider block.

4. The electric push rod according to claim 1, wherein a side wall of the outer tube is provided with a guiding slot that is extended from up to down, and the screw nut is provided with a guiding rib that is slid within the guiding slot.

5. The electric push rod according to claim 1, wherein a side wall of the outer tube is provided with a guiding slot that is extended from up to down, the slider block comprises a main body that is sleeved around the outer tube and a support portion located in the outer tube, the support portion is fixed on the main body via a connection portion which is slid within the guiding slot, and the support portion is provided with a through hole through which the threaded rod passes.

6. An electric headrest support, comprising an adjusting assembly and the electric push rod according to claim 1, wherein the adjusting assembly comprises a sliding rail, a first fastener, a second fastener, a first linkage, a second linkage, a third linkage and a fourth linkage;

wherein the sliding rail comprises a first rail and a second rail that are slidably connected with each other, the first rail is fixed on the first fastener, the second rail is fixed on a lower end of the first linkage, one end of the second fastener is pivotally connected to an upper end of the first linkage, one end of the second linkage is pivotally connected to one end of the second fastener, the first linkage and the second linkage are adjacently connected to the second fastener, one end of the third linkage is pivotally connected to a middle part of the first linkage, another end of the third linkage is pivotally connected to one end of the fourth linkage, another end of the fourth linkage is pivotally connected to the first rail, another end of the second linkage is pivotally connected to a middle part of the third linkage, the drive motor of the electric push rod is connected with the first fastener, and the slider block is connected with the first linkage.

7. The electric headrest support according to claim 6, wherein two said adjusting assemblies are arranged, and the electric push rod is configured between the two adjusting assemblies.

8. The electric headrest support according to claim 7, further comprising a fixed rod and a drive rod, wherein two ends of the fixed rod are respectively fixed to two first fasteners of the two adjusting assemblies, two ends of the drive rod are respectively fixed to two first linkages of the two adjusting assemblies, the drive motor is configured on the fixed rod, and the slider block is connected with the drive rod.

9. The electric headrest support according to claim 6, wherein a top of the first linkage is provided with an arc-shape limiting slot, the second fastener is provided with a limiting pin which is slid within the limiting slot.

10. The electric headrest support according to claim 6, wherein an elastic member is arranged between the first linkage and the second fastener to cause the second fastener to fold.

* * * * *